United States Patent
Tian et al.

(10) Patent No.: US 9,501,444 B2
(45) Date of Patent: Nov. 22, 2016

(54) USB DEVICE AND METHOD THEREOF FOR AUTOMATICALLY RECOGNIZING MICROSOFT WINDOWING OPERATING SYSTEM VERSION

(71) Applicant: ZTE Corporation, Shenzhen, Guangdong (CN)

(72) Inventors: Jun Tian, Shenzhen (CN); Weiwei Ma, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/893,607

(22) PCT Filed: Aug. 23, 2013

(86) PCT No.: PCT/CN2013/082227
§ 371 (c)(1),
(2) Date: Nov. 24, 2015

(87) PCT Pub. No.: WO2013/189432
PCT Pub. Date: Dec. 27, 2013

(65) Prior Publication Data
US 2016/0124886 A1 May 5, 2016

(30) Foreign Application Priority Data
May 28, 2013 (CN) .......................... 2013 1 0203849

(51) Int. Cl.
*G06F 3/00* (2006.01)
*G06F 13/40* (2006.01)
(Continued)

(52) U.S. Cl.
CPC ......... *G06F 13/4072* (2013.01); *G06F 9/4406* (2013.01); *G06F 13/102* (2013.01); *G06F 13/362* (2013.01); *G06F 13/4282* (2013.01); *G06F 2213/0042* (2013.01)

(58) Field of Classification Search
USPC .............. 710/10, 16, 301–304; 717/174, 177
See application file for complete search history.

(56) References Cited

U.S. PATENT DOCUMENTS

| | | | |
|---|---|---|---|
| 7,584,469 B2 * | 9/2009 | Mitekura | G06F 9/4446 717/174 |
| 2008/0127225 A1 * | 5/2008 | Mullis | G06F 9/4415 719/321 |

(Continued)

FOREIGN PATENT DOCUMENTS

| | | |
|---|---|---|
| CN | 101916238 A | 12/2010 |
| CN | 101957807 A | 1/2011 |

(Continued)

OTHER PUBLICATIONS

International Search Report in international application No. PCT/CN2013/082227, mailed on Mar. 6, 2014.

(Continued)

*Primary Examiner* — Paul R Myers
(74) *Attorney, Agent, or Firm* — Oppedahl Patent Law Firm LLC

(57) ABSTRACT

Disclosed are a USB device and a method thereof for automatically recognizing a Microsoft windowing operating system version. The method comprises: a USB device accessing a host; the USB device reporting an MOSD supporting a configuration parameter designation function to the host, a designation configuration value of the configuration parameter designation function being set to the Nth configuration parameter; when the USB device detects that the host obtains a configuration descriptor corresponding to the Nth configuration parameter, determining that a Windows operating system version is Win8; when the USB device detects that the host obtains a configuration descriptor corresponding to the first configuration parameter, and if the USB device receives only one query instruction delivered by the host, determining that a Windows operating system version is XP; or otherwise determining that the current Windows operating system version is Vista or Win 7. Embodiments of the present invention can distinguish Windows operating system versions without installing any program on a host.

12 Claims, 2 Drawing Sheets

(51) Int. Cl.
   *G06F 9/44*    (2006.01)
   *G06F 13/10*   (2006.01)
   *G06F 13/42*   (2006.01)
   *G06F 13/362*  (2006.01)

(56) References Cited

U.S. PATENT DOCUMENTS

| | | |
|---|---|---|
| 2008/0195765 A1 | 8/2008 | Xie |
| 2012/0054372 A1* | 3/2012 | Chen ............... G06F 9/4415 710/13 |
| 2012/0054384 A1* | 3/2012 | Zhang ............... G06F 13/387 710/62 |
| 2013/0031277 A1 | 1/2013 | Lu et al. |
| 2013/0055015 A1* | 2/2013 | Gui ............... G06F 11/0745 714/15 |
| 2014/0040881 A1* | 2/2014 | Thorsen ............ G06F 9/4411 717/177 |
| 2014/0297901 A1 | 10/2014 | Peng |

FOREIGN PATENT DOCUMENTS

| | | |
|---|---|---|
| CN | 102890662 A | 1/2013 |
| EP | 2562649 A2 | 2/2013 |
| WO | 2012155573 A1 | 11/2012 |

OTHER PUBLICATIONS

English Translation of the Written Opinion of the International Search Authority in international application No. PCT/CN2013/082227, mailed on Mar. 6, 2014.

Supplementary European Search Report in European application No. 13807275.6, mailed on Mar. 10, 2016.

"Universal Serial Bus Specification Revision 2.0", Universal Serial Bus Specification, No. Rev. 2.0, Apr. 27, 2000 (Apr. 27, 2000), pp. 1-622, XP001544046, * the whole document *, mailed on Apr. 27, 2000.

Balden et al: "USB RNDIS/CDC White Paper", Internet Citation, Jan. 15, 2003 (Jan. 15, 2003), XP002389884, Retrieved from the Internet: URL: http://www.belcarra.com/rndis/blcarra usb rndis.htm [retrieved on Jul. 12, 2006] * the whole document *, mailed on Jul. 12, 2006.

"MBIM-Based Mobile Broadband Requirements for Windows", Apr. 23, 2012 (Apr. 23, 2012), XP055254621, Retrieved from the Internet: URL: http://msdn.microsoft.com/en-us/windows/hardware/hh918600 * the whole document *, mailed on Apr. 23, 2012.

"Microsoft OS Descriptors Overview", Nov. 19, 2012 (Nov. 19, 2012), XP055254629, Retrieved from the Internet: URL: http://msdn.microsoft.com/en-us/windows/hardware/gg463179 * the whole document *, mailed on Nov. 19, 2012.

* cited by examiner

USB DEVICE AND METHOD THEREOF FOR AUTOMATICALLY RECOGNIZING MICROSOFT WINDOWING OPERATING SYSTEM VERSION

TECHNICAL FIELD

The disclosure relates to the field of Universal Serial Bus (USB) technology, and in particular to a USB device and method for automatically identifying a release of a Microsoft Windows Operating System (OS) by the USB device.

BACKGROUND

USB technology is a Serial Bus standard allowing communication between a host and a peripheral, supporting hot swap and Plug and Play, presently in extensive use. With rapid development of USB devices, an increasing number of USB devices have being applied to various OSs. Diversity in designs of OSs leads to diversified features in their support to a USB device. Therefore, manufacturers face a problem of how to distinguish an OS a USB device is being plugged in.

There are mainly two existing OS identifying methods. According to one OS identifying method, a program is installed beforehand on an OS, and a Personal Computer (PC) may determine a type of an OS by sending an OS-dependent identifying command to a USB device. With such an OS identifying method, for different OSs, different programs have to be installed, different identifying commands have to be agreed upon, and only a Windows OS, a Linux OS and a MACOS can be distinguished; a release of a Microsoft Windows OS cannot be distinguished using such a method. According to the other OS identifying method, a type of an OS may be determined according to a USB-specific descriptor, implementing automatic identification. Likewise, with such an OS identifying method, only a Windows OS and a Non-Windows OS can be distinguished; no specific release of a Microsoft Windows OS can be distinguished either.

SUMMARY

Embodiments herein may provide a USB device and method for automatically identifying a release of a Microsoft Windows Operating System (OS) by the USB device, capable of automatically distinguishing a specific release type of a Windows OS without the need to install any auxiliary program on a host.

To this end, a technical solution according to an embodiment herein may be implemented as follows.

An embodiment herein may provide a method for automatically identifying a release of a Microsoft Windows Operating System (OS) by a Universal Serial Bus (USB) device. The method may include:

accessing, by a USB device, a host, and reporting, to the host, M configuration parameters, the M being an integer greater than 1;

enumerating the USB device as a Trans-Flash (TF) card device, and reporting, to the host during the enumerating, configuration-parameter-designation supporting Microsoft OS Descriptors (MOSD), a configuration value designated by configuration-parameter-designation being set as the Nth configuration parameter, the N being an integer greater than 1 and no greater than the M;

when detecting that the host has acquired a configuration descriptor corresponding to the Nth configuration parameter, determining, by the USB device, that a release of a present Microsoft Windows OS is Win8;

when detecting that the host has acquired a configuration descriptor corresponding to the first configuration parameter and when having received only one INQUIRY instruction issued by the host, determining, by the USB device, that a release of a present Microsoft Windows OS is XP; when having received at least two INQUIRY instructions issued by the host, determining, by the USB device, that a release of a present Microsoft Windows OS is Vista or Win7.

The method may further include: when having determined a release of a Microsoft Windows OS being XP, enumerating, by the USB device, a USB port as a virtual CD or as combination of a virtual CD and the TF card device, and booting, using a driver installation file in the virtual CD, a Remote Network Driver Interface Specification (RNDIS) driver.

The method may further include: when having determined a release of a Microsoft Windows OS being Win8, sending, by the USB device, the host a Mobile Broadband Interface Model (MBIM) driver loading signal, such that the host automatically loads an MBIM driver.

The method may further include: when having determined a release of a Microsoft Windows OS being Win8, enumerating, by the USB device, the USB port as an RNDIS device or as combination of an RNDIS device and a mass storage.

The method may further include: when having determined a release of a Microsoft Windows OS being Vista or Win7, enumerating, by the USB device, the USB port as an RNDIS device or as combination of an RNDIS device and a mass storage.

An embodiment herein may further provide a Universal Serial Bus (USB) device, including:

a USB configuration reporting module, configured for: when the USB device accesses a host, reporting, to the host, M configuration parameters, the M being an integer greater than 1 and configuration descriptors corresponding respectively to the M configuration parameters being stored in the USB configuration reporting module;

an enumerating module, configured for: enumerating a USB port as a Trans-Flash (TF) card device, and reporting, to the host during the enumerating, configuration-parameter-designation supporting Microsoft OS Descriptors (MOSD), a configuration value designated by configuration-parameter-designation being set as the Nth configuration parameter, the N being an integer greater than 1 and no greater than the M;

a configuration detecting module, configured for: detecting a configuration descriptor acquired by the host from the USB configuration reporting module;

an INQUIRY instruction detecting module, configured for: detecting an INQUIRY instruction issued by the host;

a Microsoft Windows OS release determining module, configured for: when the configuration detecting module detects that the host has acquired, from the USB configuration reporting module, a configuration descriptor corresponding to the Nth configuration parameter, determining that a release of a present Microsoft Windows OS is Win8; when the configuration detecting module detects that the host has acquired, from the USB configuration reporting module, a configuration descriptor corresponding to the first configuration parameter and when the INQUIRY instruction detecting module detects only one INQUIRY instruction issued by the host, determining that a release of a present Microsoft Windows OS is XP; when the INQUIRY instruction detecting module detects at least two INQUIRY instructions issued by the host, determining that a release of a present Microsoft Windows OS is Vista or Win7.

The enumerating module may be further configured for: when the Microsoft Windows OS release determining module has determined that a release of a Microsoft Windows OS is XP, enumerating the USB port as a virtual CD or as combination of a virtual CD and the TF card device.

The USB device may further include a driver booting module configured for: booting, using a driver installation file in the virtual CD, a Remote Network Driver Interface Specification (RNDIS) driver.

The enumerating module may be further configured for: when the Microsoft Windows OS release determining module has determined that a release of a Microsoft Windows OS is Win8, enumerating the USB port as a Mobile Broadband Interface Model (MBIM) device, such that the host automatically loads an MBIM driver.

The enumerating module may be further configured for: when the Microsoft Windows OS release determining module has determined that a release of a Microsoft Windows OS is Win8, enumerating the USB port as an RNDIS device or as combination of an RNDIS device and a mass storage.

The enumerating module may be further configured for: when the Microsoft Windows OS release determining module has determined that a release of a Microsoft Windows OS is Vista or Win7, enumerating the USB port as an RNDIS device or as combination of an RNDIS device and a mass storage.

With a USB device according to an embodiment herein and method for automatically identifying a release of a Microsoft Windows OS by the USB device, a USB device is allowed to automatically identify a specific release type of a present Windows OS without the need to install any auxiliary program on a host, implementing simple, convenient, highly operable, and more flexible use of the USB device for Windows OSs of different types, effectively solving the compatibility problem caused by the method for detecting a type of a Windows OS by installing different software on a host in related art.

DETAILED DESCRIPTION

An existing mainstream OS is a Windows OS. A Windows OS may include Windows XP, VISTA, Windows7 (WIN7), and Windows8 (WIN8). Various OSs are characterized in their support to a USB device. In addition, in general a new type of USB device will be added in a high release of a Windows OS. A USB protocol may include that for one USB device, multiple configuration sets may exist, although at a time only one of which may take effect. After a USB device is plugged into a host, the host will issue a USB request to acquire information such as a device descriptor, a configuration descriptor, and an interface descriptor. When the USB device includes multiple configuration sets, the device descriptor may have to include a specific configuration number. The host may issue, according to the USB-reported configuration number, a request to acquire any specific configuration parameter.

Windows OSs Windows XP, Vista, Windows7 (WIN7) and Windows8 (WIN8) each may support a special extended instruction, namely, a Windows OS MOSD, ensuring that a host installed with a Windows OS may allow a USB device to report some specific information by MOSD. A special MOSD "ALTRCFG" included in WIN8 may allow WIN8 to select a specific configuration set.

In addition, when a USB device is enumerated as a TF card, interaction between a host and the USB device will be performed through a Small Computer System Interface (SCSI) instruction. The SCSI instruction may include an INQUIRY instruction for returning specific information on a present Logic Unit (LUN).

The host may be a computer. The USB device may be a wireless network card, a wireless data card, or the like.

Based on characteristics of the Win8 MOSD and an INQUIRY instruction in the SCSI instruction, the disclosure may provide a method for automatically identifying a release of a Microsoft Windows Operating System (OS) by a Universal Serial Bus (USB) device and USB device.

Figure 1:
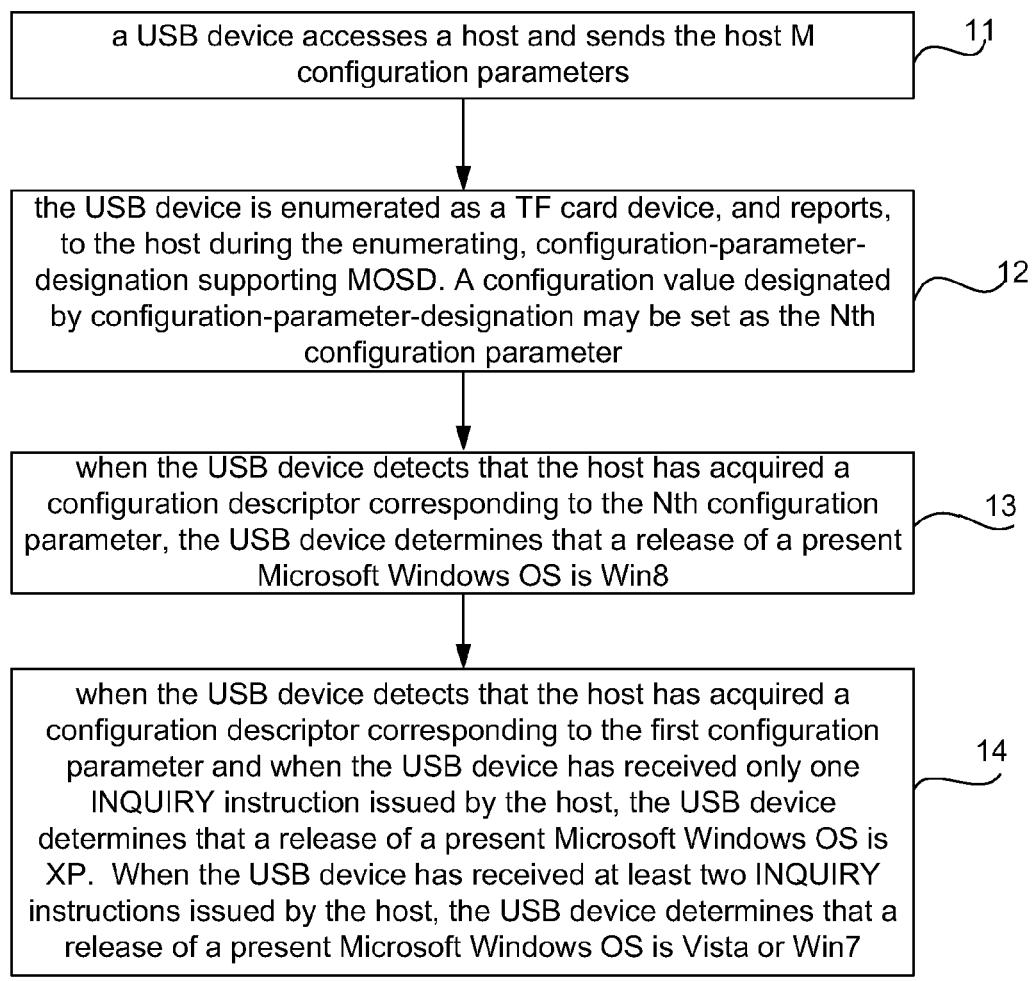
FIG. 1 is a flowchart of a method for automatically identifying a release of a Microsoft Windows OS by a USB device according to a first embodiment herein.

FIG. 1 is a flowchart of a method for automatically identifying a release of a Microsoft Windows OS by a USB device according to a first embodiment herein. As shown in FIG. 1, a method for automatically identifying a release of a Microsoft Windows OS by a USB device according to the first embodiment herein may include steps as follows.

In step 11, a USB device accesses a host and sends the host M configuration parameters. The M may be an integer greater than 1.

In step 12, the USB device may be enumerated as a Trans-Flash (TF) card device. The USB device may report, to the host during the enumerating, configuration-parameter-designation supporting Microsoft OS Descriptors (MOSD). A configuration value designated by configuration-parameter-designation may be set as the Nth configuration parameter. The N may be an integer greater than 1 and no greater than the M.

In step 13, when the USB device detects that the host has acquired, from the USB device, a configuration descriptor corresponding to the Nth configuration parameter, the USB device may determine that a release of a present Microsoft Windows OS is Win8.

In step 14, when the USB device detects that the host has acquired, from the USB device, a configuration descriptor corresponding to the first configuration parameter and when the USB device has received only one INQUIRY instruction issued by the host, the USB device may determine that a release of a present Microsoft Windows OS is XP. When the USB device has received at least two INQUIRY instructions issued by the host, the USB device may determine that a release of a present Microsoft Windows OS is Vista or Win7.

With the method for automatically identifying a release of a Microsoft Windows OS by a USB device according to the first embodiment herein, a USB device is allowed to automatically distinguish a specific release type of a present Windows OS without the need to install any auxiliary program on a host, implementing simple, convenient, highly operable, and more flexible use of the USB device for Windows OSs of different types, effectively solving the compatibility problem caused by the method for detecting a type of a Windows OS by installing different software on a host in related art.

For example, a method for automatically identifying a release of a Microsoft Windows OS by a USB device herein may be implemented as follows.

First, a USB device may access a host and report, to the host, five configuration parameters.

Then, the USB device may enumerate itself as a TF card device. During the enumeration, the USB device will report, to the host, MOSD information. The USB device may report, to the host, support to ALTRCFG. A configuration value designated in the ALTRCFG may be set as the second configuration parameter.

When the USB device detects that the host has acquired, from the USB device, a configuration descriptor corresponding to the second configuration parameter, it may be determined that the host is installed with a Windows OS of a Win8 release. When the USB device detects that the host by default still acquires, from the USB device, the configuration descriptor corresponding to the first configuration parameter, it may be determined that the host is installed with a Windows OS of a Non-Win8 release.

When the USB device determines that the host is installed with a Windows OS of a Non-Win8 release, when the USB device detects that the host issue only one INQUIRY instruction to the USB device, it may be determined that the host is installed with a Windows OS of a XP release. When the USB device detects that the host issues at least two INQUIRY instructions to the USB device, it may be determined that the host is installed with a Windows OS of a Vista or Win7 release.

A USB network device driver supportable by an existing Windows OS per se may include an RNDIS network driver and an MBIM network driver. An RNDIS driver protocol may be supported on existing mainstream XP, Vista, Win7, and Win8. However, a driver installation file has to be provided on XP to boot the system to install an RNDIS driver. Vista, Win7, and Win8 per se may load a RNDIS driver when booted. However, only Win8 may support an MBIM driver. MBIM is a brand-new Mobile Broadband Interface Model proposed by Microsoft in Win8.

Based on an aforementioned feature, with a method for automatically identifying a release of a Microsoft Windows OS by a USB device according to an embodiment herein, after the release of the Windows OS installed on the host has been identified, USB network device drive may further be performed according to the specific release.

A method for automatically identifying a release of a Microsoft Windows OS by a USB device according to an embodiment herein may further include: when having determined a release of a Microsoft Windows OS being XP, enumerating, by the USB device, a USB port as a virtual CD or as combination of a virtual CD and the TF card device, and booting, using a driver installation file in the virtual CD, a Remote Network Driver Interface Specification (RNDIS) driver.

A method for automatically identifying a release of a Microsoft Windows OS by a USB device according to an embodiment herein may further include: when having determined a release of a Microsoft Windows OS being Win8, sending, by the USB device, the host a Mobile Broadband Interface Model (MBIM) driver loading signal, such that the host automatically loads an MBIM driver.

A method for automatically identifying a release of a Microsoft Windows OS by a USB device according to an embodiment herein may further include: when the USB device determines that a release of a Microsoft Windows OS is WIN8, Vista or Win7, enumerating the USB port as an RNDIS device or as combination of an RNDIS device and a mass storage.

According to a method for automatically identifying a release of a Microsoft Windows OS by a USB device according to an embodiment herein, a type the USB port is to be enumerated as is selected according to the determined release of the Windows OS, such that USB network device drive may be implemented automatically.

Figure 2:
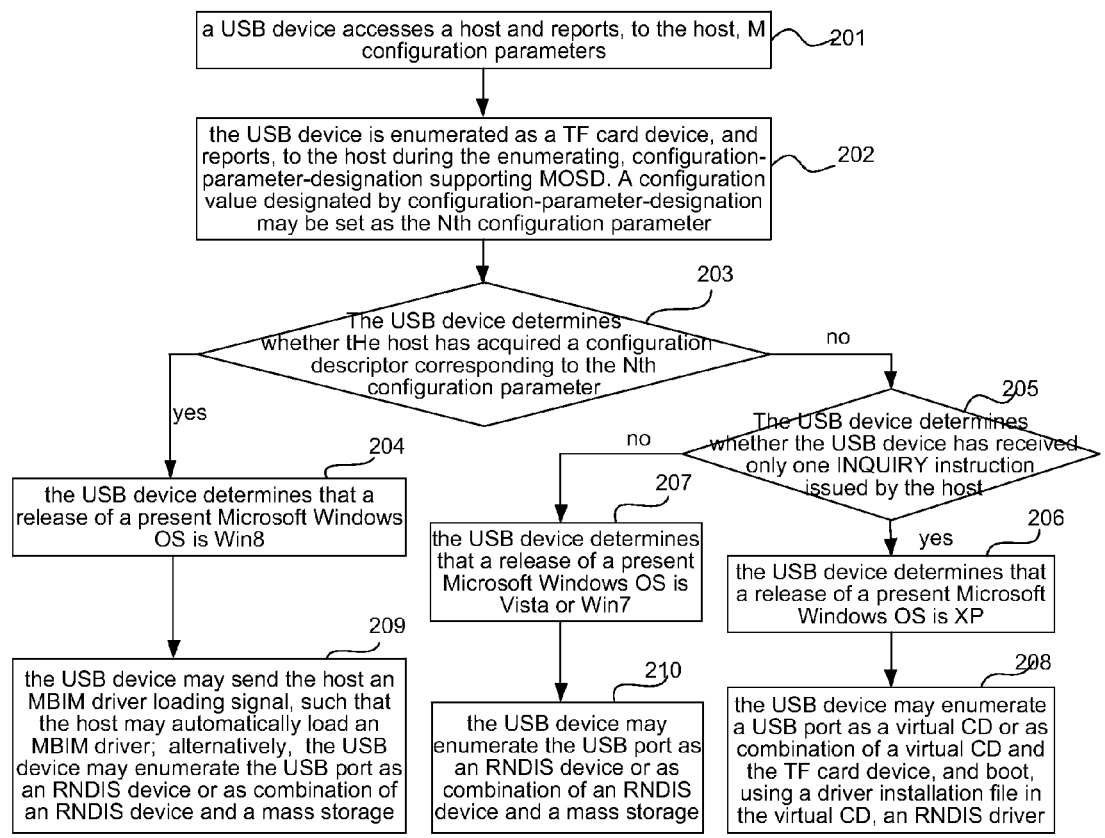
FIG. 2 is a flowchart of a method for automatically identifying a release of a Microsoft Windows OS by a USB device according to a second embodiment herein.

FIG. 2 is a flowchart of a method for automatically identifying a release of a Microsoft Windows OS by a USB device according to a second embodiment herein. As shown in FIG. 2, a method for automatically identifying a release of a Microsoft Windows OS by a USB device according to the second embodiment herein may include steps as follows.

In step 201, a USB device accesses a host and sends the host M configuration parameters. The M may be an integer greater than 1.

In step 202, the USB device is enumerated as a TF card device, and reports, to the host during the enumerating, configuration-parameter-designation supporting MOSD. A configuration value designated by configuration-parameter-designation may be set as the Nth configuration parameter. The N may be an integer greater than 1 and no greater than the M.

In step 203, the USB device determines whether the host has acquired, from the USB device, a configuration descriptor corresponding to the Nth configuration parameter. If so, the flow goes to step 204. Otherwise, the flow goes to step 205.

In step 204, the USB device determines that a release of a present Microsoft Windows OS is Win8. The flow goes to step 209.

In step 205, the USB device determines whether the USB device has received only one INQUIRY instruction issued by the host. If so, the flow goes to step 206. Otherwise, the flow goes to step 207.

In step 206, the USB device determines that a release of a present Microsoft Windows OS is XP. The flow goes to step 208.

In step 207, the USB device determines that a release of a present Microsoft Windows OS is Vista or Win7. The flow goes to step 210.

In step 208, the USB device may enumerate a USB port as a virtual CD or as combination of a virtual CD and the TF card device, and boot, using a driver installation file in the virtual CD, an RNDIS driver. The flow ends.

In step 209, the USB device may sends the host an MBIM driver loading signal, such that the host may automatically load an MBIM driver, and the flow ends; alternatively, the USB device may enumerate the USB port as an RNDIS device or as combination of an RNDIS device and a mass storage, and the flow ends.

In step 210, the USB device may enumerate the USB port as an RNDIS device or as combination of an RNDIS device and a mass storage. The flow ends.

With a method for automatically identifying a release of a Microsoft Windows OS by a USB device according to the second embodiment herein, a USB device is allowed to automatically distinguish a specific release type of a present Windows OS without the need to install any auxiliary program on a host; USB network device drive may further be performed according to the specific release.

Figure 3:
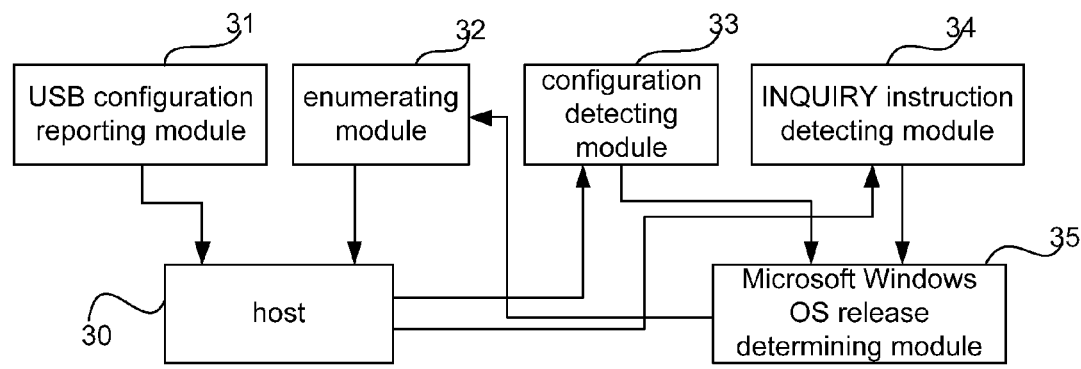
FIG. 3 is a diagram of a structure of a USB device according to a first embodiment herein.

FIG. 3 is a diagram of a structure of a USB device according to a first embodiment herein. As shown in FIG. 3, a USB device according to an embodiment herein may include modules as follows.

The USB device may include a USB configuration reporting module 31 connected to a host 30. The USB configuration reporting module 31 may be configured for: when the USB device accesses the host 30, reporting, to the host 30, M configuration parameters. The M may be the integer greater than 1. Configuration descriptors corresponding respectively to the M configuration parameters may be stored in the USB configuration reporting module 31.

The USB device may include an enumerating module 32 connected to the host 30. The enumerating module 32 may be configured for: enumerating a USB port as a TF card device, and reporting, to the host 30 during the enumerating, configuration-parameter-designation supporting MOSD. A configuration value designated by configuration-parameter-designation may be set as the Nth configuration parameter. The N may be an integer greater than 1 and no greater than the M.

The USB device may include a configuration detecting module 33 connected to the host 30. The configuration detecting module 33 may be configured for: detecting a configuration descriptor acquired by the host 30 from the USB configuration reporting module 31.

The USB device may include an INQUIRY instruction detecting module 34 connected to the host 30. The INQUIRY instruction detecting module 34 may be configured for: detecting an INQUIRY instruction issued by the host 30.

The USB device may include a Microsoft Windows OS release determining module 35 connected to the configuration detecting module 33. The Microsoft Windows OS release determining module 35 may be configured for: when the configuration detecting module 33 detects that the host 30 has acquired, from the USB configuration reporting module 31, a configuration descriptor corresponding to the Nth configuration parameter, determining that a release of a present Microsoft Windows OS is Win8. The Microsoft Windows OS release determining module 35 may be further connected to the INQUIRY instruction detecting module 34. The Microsoft Windows OS release determining module 35 may further be configured for: when the configuration detecting module 33 detects that the host 30 has acquired, from the USB configuration reporting module 31, a configuration descriptor corresponding to the first configuration parameter and when the INQUIRY instruction detecting module 34 detects only one INQUIRY instruction issued by the host 30, determining that a release of a present Microsoft Windows OS is XP; when the INQUIRY instruction detecting module 34 detects at least two INQUIRY instructions issued by the host 30, determining that a release of a present Microsoft Windows OS is Vista or Win7.

As shown in FIG. 3, the enumerating module 32 may further be connected to the Microsoft Windows OS release determining module 35. The enumerating module 32 may further be configured for: when the Microsoft Windows OS release determining module has determined that a release of a Microsoft Windows OS is WIN6, Vista or Win7, enumerating the USB port as an RNDIS device or as combination of an RNDIS device and a mass storage.

The enumerating module may further be configured for: when the Microsoft Windows OS release determining module has determined that a release of a Microsoft Windows OS is Win8, enumerating the USB port as a Mobile Broadband Interface Model (MBIM) device, such that the host automatically loads an MBIM driver.

The enumerating module may further be configured for: when the Microsoft Windows OS release determining module has determined that a release of a Microsoft Windows OS is XP, enumerating the USB port as a virtual CD or as combination of a virtual CD and the TF card device.

The USB device may further include a driver booting module configured for: booting, using a driver installation file in the virtual CD, a Remote Network Driver Interface Specification (RNDIS) driver.

In the USB device in actual application, the USB configuration reporting module 31, the enumerating module 32, the configuration detecting module 33, the INQUIRY instruction detecting module 34, the Microsoft Windows OS release determining module 35, and the driver booting module may all be implemented by a Central Processing Unit (CPU), a Digital Signal Processor (DSP), or a Field-Programmable Gate Array (FPGA) in the device.

With a USB device according to an embodiment herein, a specific release type of a present Windows OS may be automatically identified without the need to install any auxiliary program on a host, implementing simple, convenient, highly operable, and more flexible use of the USB device for Windows OSs of different types, effectively solving the compatibility problem caused by the method for detecting a type of a Windows OS by installing different software on a host in related art; in addition, USB network device driver may be performed automatically.

What described are implementations herein. Note that those skilled in the art may make further improvements and modifications without departing from the principle of the disclosure. Such improvements and modifications should also be included in the protection scope of the disclosure.

INDUSTRIAL APPLICABILITY

With embodiments herein, using characteristics of Win8 MOSD and an INQUIRY instruction in an SCSI instruction between a USB device and an accessed host, the USB device may be allowed to automatically identify a specific release type of a present Windows OS, implementing simple, convenient, highly operable, and more flexible use of the USB device for Windows OSs of different types, solving the compatibility problem caused by the method for detecting a type of a Windows OS by installing different software on a host in related art.

The invention claimed is:

1. A method for automatically identifying a release of a Microsoft Windows Operating System (OS) by a Universal Serial Bus (USB) device, comprising:
   accessing, by a USB device, a host, and reporting, to the host, M configuration parameters, the M being an integer greater than 1;
   enumerating the USB device as a Trans-Flash (TF) card device, and reporting, to the host during the enumerating, configuration-parameter-designation supporting Microsoft OS Descriptors (MOSD), a configuration value designated by configuration-parameter-designation being set as the Nth configuration parameter, the N being an integer greater than 1 and no greater than the M;
   when detecting that the host has acquired a configuration descriptor corresponding to the Nth configuration parameter, determining, by the USB device, that a release of a present Microsoft Windows OS is Win8;
   when detecting that the host has acquired a configuration descriptor corresponding to the first configuration parameter and when having received only one INQUIRY instruction issued by the host, determining, by the USB device, that a release of a present Microsoft Windows OS is XP; when having received at least two INQUIRY instructions issued by the host, determining, by the USB device, that a release of a present Microsoft Windows OS is Vista or Win7.

2. The method according to claim 1, further comprising: when having determined a release of a Microsoft Windows OS being XP, enumerating, by the USB device, a USB port as a virtual CD or as combination of a virtual CD and the TF card device, and booting, using a driver installation file in the virtual CD, a Remote Network Driver Interface Specification (RNDIS) driver.

3. The method according to claim 2, further comprising: when having determined a release of a Microsoft Windows OS being Win8, sending, by the USB device, the host a Mobile Broadband Interface Model (MBIM) driver loading signal, such that the host automatically loads an MBIM driver.

4. The method according to claim 2, further comprising: when having determined a release of a Microsoft Windows OS being Win8, enumerating, by the USB device, the USB port as an RNDIS device or as combination of an RNDIS device and a mass storage.

5. The method according to claim 4, further comprising: when having determined a release of a Microsoft Windows OS being Vista or Win7, enumerating, by the USB device, the USB port as an RNDIS device or as combination of an RNDIS device and a mass storage.

6. The method according to claim 3, further comprising: when having determined a release of a Microsoft Windows OS being Vista or Win7, enumerating, by the USB device, the USB port as an RNDIS device or as combination of an RNDIS device and a mass storage.

7. A Universal Serial Bus (USB) device, comprising:
a USB configuration reporting module, configured for: when the USB device accesses a host, reporting, to the host, M configuration parameters, the M being an integer greater than 1, and configuration descriptors corresponding respectively to the M configuration parameters being stored in the USB configuration reporting module;
an enumerating module, configured for: enumerating a USB port as a Trans-Flash (TF) card device, and reporting, to the host during the enumerating, configuration-parameter-designation supporting Microsoft OS Descriptors (MOSD), a configuration value designated by configuration-parameter-designation being set as the Nth configuration parameter, the N being an integer greater than 1 and no greater than the M;
a configuration detecting module, configured for: detecting a configuration descriptor acquired by the host from the USB configuration reporting module;
an INQUIRY instruction detecting module, configured for: detecting an INQUIRY instruction issued by the host; and
a Microsoft Windows OS release determining module, configured for: when the configuration detecting module detects that the host has acquired, from the USB configuration reporting module, a configuration descriptor corresponding to the Nth configuration parameter, determining that a release of a present Microsoft Windows OS is Win8; when the configuration detecting module detects that the host has acquired, from the USB configuration reporting module, a configuration descriptor corresponding to the first configuration parameter and when the INQUIRY instruction detecting module detects only one INQUIRY instruction issued by the host, determining that a release of a present Microsoft Windows OS is XP; when the INQUIRY instruction detecting module detects at least two INQUIRY instructions issued by the host, determining that a release of a present Microsoft Windows OS is Vista or Win7.

8. The device according to claim 7, further comprising a driver booting module, wherein
the enumerating module is further configured for: when the Microsoft Windows OS release determining module has determined that a release of a Microsoft Windows OS is XP, enumerating the USB port as a virtual CD or as combination of a virtual CD and the TF card device; and
the driver booting module is configured for: booting, using a driver installation file in the virtual CD, a Remote Network Driver Interface Specification (RNDIS) driver.

9. The device according to claim 8, wherein the enumerating module is further configured for: when the Microsoft Windows OS release determining module has determined that a release of a Microsoft Windows OS is Win8, enumerating the USB port as a Mobile Broadband Interface Model (MBIM) device, such that the host automatically loads an MBIM driver.

10. The device according to claim 9, wherein the enumerating module is further configured for: when the Microsoft Windows OS release determining module has determined that a release of a Microsoft Windows OS is Vista or Win7, enumerating the USB port as an RNDIS device or as combination of an RNDIS device and a mass storage.

11. The device according to claim 8, wherein the enumerating module is further configured for: when the Microsoft Windows OS release determining module has determined that a release of a Microsoft Windows OS is Win8, enumerating the USB port as an RNDIS device or as combination of an RNDIS device and a mass storage.

12. The device according to claim 11, wherein the enumerating module is further configured for: when the Microsoft Windows OS release determining module has determined that a release of a Microsoft Windows OS is Vista or Win7, enumerating the USB port as an RNDIS device or as combination of an RNDIS device and a mass storage.

* * * * *